US008072663B2

(12) United States Patent  
O'Neill et al.

(10) Patent No.: US 8,072,663 B2
(45) Date of Patent: Dec. 6, 2011

(54) SCANNING SYSTEM FOR LIDAR

(75) Inventors: James O'Neill, Ottawa (CA); William T. Moore, West Vancouver (CA); Kevin Williams, Ottawa (CA); Robert Bruce, Stittsville (CA)

(73) Assignee: Autonosys Inc., Ottawa (CA)

( * ) Notice: Subject to any disclaimer, the term of this patent is extended or adjusted under 35 U.S.C. 154(b) by 415 days.

(21) Appl. No.: 12/447,937

(22) PCT Filed: Oct. 30, 2007

(86) PCT No.: PCT/CA2007/002033
§ 371 (c)(1),
(2), (4) Date: Apr. 30, 2009

(87) PCT Pub. No.: WO2008/052365
PCT Pub. Date: May 8, 2008

(65) Prior Publication Data
US 2010/0053715 A1    Mar. 4, 2010

Related U.S. Application Data

(60) Provisional application No. 60/855,146, filed on Oct. 30, 2006.

(51) Int. Cl.
*G02B 26/08* (2006.01)
(52) U.S. Cl. .................................. 359/199.3; 359/200.7
(58) Field of Classification Search ................ 359/199.3, 359/200.7
See application file for complete search history.

(56) References Cited

U.S. PATENT DOCUMENTS

| 4,626,063 | A | 12/1986 | Honey ........................ 359/200.1 |
| 5,006,721 | A | 4/1991 | Cameron et al. ......... 250/559.16 |
| 2003/0063357 | A1 | 4/2003 | Maruyama et al. ........... 359/199 |
| 2004/0190577 | A1 | 9/2004 | Albrecht et al. ................ 372/55 |
| 2005/0099637 | A1 | 5/2005 | Kacyra et al. ................. 356/601 |
| 2005/0184156 | A1 | 8/2005 | Otsuki et al. .................. 235/454 |
| 2010/0118363 | A1* | 5/2010 | Shigematsu et al. ....... 359/199.3 |

OTHER PUBLICATIONS

"Rotary Encoders" Heidenhain, Catalogue Heidenhain, Nov. 1, 2005 pp. 1-64.
"Drawing Rotary Actuator" Heason Technology Group, Jan. 1, 1990 www.heason.com/download/599/ra29-11-002a-datasheet.html.

* cited by examiner

*Primary Examiner* — James Phan
(74) *Attorney, Agent, or Firm* — Teitelbaum & MacLean; Neil Teitelbaum; Doug MacLean

(57) ABSTRACT

The present invention relates to a scanning system optimized for lidar that includes a nodding mirror, a rotary electromagnetic drive, a rotary optical encoder, and control circuitry. The rotary electromagnetic drive includes a yoke incorporating a permanent magnet, and an arm having a coil at one end of the arm. The coil is enclosed within the yoke, and an opposite end of the arm is coupled to the nodding mirror, such that movement of the coil within the yoke in response to a current causes the nodding mirror to rotate. The rotary optical encoder produces an output signal in response to rotation of the nodding mirror, which serves as feedback to the control circuitry. The control circuitry adjusts the current provided to the rotary electromagnetic drive in response to the output signal, such that the nodding mirror rotates in a reference scan pattern.

25 Claims, 10 Drawing Sheets

SCANNING SYSTEM FOR LIDAR

CROSS-REFERENCE TO RELATED APPLICATIONS

The present invention claims priority from U.S. Patent Application No. 60/855,146 filed Oct. 30, 2006, which is incorporated herein by reference.

TECHNICAL FIELD

The present invention relates to scanning systems and, in particular, to scanning systems for lidar.

BACKGROUND OF THE INVENTION

Light detection and ranging (lidar) is a technique for remote imaging, in which the distance of an object is measured using laser light. A typical lidar system includes a rangefinder and a scanning system. The rangefinder, typically, includes a laser with a wavelength in the ultraviolet (UV) to near-infrared (NIR) range, as well as a receiver. The distance to an object can be determined by measuring the time taken for outgoing pulses of laser light to be reflected back into the receiver, or by measuring the phase shift between an outgoing and an incoming modulated beam of laser light. The scanning system, typically, includes a mirror system for scanning the field of view of the lidar system over the area to be imaged by reflecting the outgoing and incoming laser light.

To satisfactorily image static and moving objects by lidar in applications such as autonomous vehicle operation, collision avoidance, and surveillance, accurate scanning at a high repetition rate is necessary. For instance, even for a relatively modest image resolution of 144 lines at a frame rate of 5 Hz, 720 lines per second must be acquired. Therefore, mirror systems that are capable of accurately executing a scan pattern at high angular speeds are desired.

Conventionally, two main types of mirror system are applied in scanning systems for lidar, nodding-mirror systems and polygonal-mirror systems. Nodding-mirror systems include a nodding mirror, which is, typically, a planar mirror that rotates clockwise and counterclockwise through an angular range. Polygonal-mirror systems include a polygonal mirror, which is a faceted mirror shaped as a regular polygon. The polygonal mirror can be rotated clockwise or counterclockwise through 360°.

Nodding-mirror systems offer the advantage that, provided the nodding mirror is large enough, the efficiency of the nodding mirror in collecting the reflected light into the rangefinder, hereafter referred to as collection efficiency, is near-perfect over the entire angular range. In contrast, the collection efficiency is not uniform over all angular positions of the polygonal mirror. As the outgoing light from the rangefinder approaches the edges of the facets of the polygonal mirror, the collection efficiency drops to 50%. Furthermore, owing to manufacturing errors, the dimensions of the polygonal mirror may deviate from those of a regular polygon, leading to image distortion.

However, polygonal-mirror systems offer the advantage that once the polygonal mirror is set in rotation, the angular speed of the polygonal mirror must simply be maintained. In contrast, the rotation of the nodding mirror must be periodically stopped and reversed when the nodding mirror reaches the end of the angular range. Therefore, the angular speed at which the nodding mirror can be rotated through a scan pattern is, typically, lower than that of the polygonal mirror.

In a conventional scan pattern, the nodding mirror is rotated at a constant angular speed in one direction through an angular range and then rotated as fast as possible in the opposite direction to the start of the angular range. During the segment of the scan pattern in which the nodding mirror is returning to the start of the angular range, useful data is not being collected into the rangefinder. To optimally execute such a scan pattern, the nodding mirror should ideally be capable of rotating at high angular speeds and of undergoing rapid angular acceleration.

Nodding-mirror systems with a variety of configurations have been implemented in scanning systems for lidar, but these conventional nodding-mirror system have some important limitations.

Different types of rotary drives have been used to rotate the nodding mirror in such nodding-mirror systems. Nodding-mirror systems including stepper motors are disclosed in U.S. Pat. No. 5,337,189 to Krawczyk, et al. and U.S. Pat. No. 6,650,402 to Sullivan, et al., for example. However, these nodding-mirror systems have the disadvantage that the gear mechanism of the stepper motors introduces backlash, limiting the accuracy and the angular speed of the rotation of the nodding mirror. Nodding-mirror systems including galvanometer motors are disclosed in U.S. Pat. No. 5,006,721 to Cameron, et al., U.S. Pat. No. 7,135,672 to Land, and U.S. Pat. No. 7,215,430 to Kacyra, et al., for example. However, these nodding-mirror systems have the disadvantage that the galvanometer motors provide relatively low torque, limiting the size of the nodding mirror that can be rotated.

Such nodding-mirror systems may also include different types of detectors for ascertaining the angular position of the nodding mirror. Nodding-mirror systems including angular-position sensors are disclosed in U.S. Pat. No. 4,810,088 to Karning, et al. and U.S. Pat. No. 6,262,800 to Minor, for example. Nodding-mirror systems including rotary encoders are disclosed in U.S. Pat. No. 5,231,401 to Kaman, et al., U.S. Pat. No. 6,107,770 to Jackson, et al., and U.S. Pat. No. 7,215,430 to Kacyra, et al., for example. The output signals of such detectors, typically, serve as feedback to control circuitry for controlling the rotary drive. The effectiveness of the closed-loop feedback control is limited by the accuracy and resolution of the detectors.

An object of the present invention is to overcome the shortcomings of the prior art by providing a scanning system optimized for a lidar system. As part of such a scanning system for lidar, an optimized nodding-mirror system is provided that includes a nodding mirror, a rotary electromagnetic drive, a rotary optical encoder, and control circuitry. The rotary electromagnetic drive is lightweight, yet powerful enough to rotate a nodding mirror of the size preferred for lidar systems, at high angular speeds. The absence of mechanical linkages between the stationary yoke of the rotary electromagnetic drive and the moving arm, which is coupled to the nodding mirror, eliminates the possibility of any backlash and allows the direction of torque applied to the nodding mirror to be essentially instantly reversed. The rotary optical encoder of the nodding-mirror system has a high resolution and accuracy. Moreover, the detector of the rotary optical encoder and the encoder disk, which is coupled to the nodding mirror, are free of mechanical linkages, precluding backlash. The use of such a rotary optical encoder allows very accurate closed-loop feedback control of the scan pattern of the nodding mirror through control circuitry.

The unprecedented and advantageous combination of elements in the nodding-mirror system allows a variety of scan patterns to be accurately executed by the nodding mirror. Furthermore, additional mirror systems may be included in certain embodiments of the scanning system to increase the field of view of the lidar system.

An optimized polygonal-mirror system that includes a polygonal mirror, a rotary drive, a rotary encoder, and control circuitry is also provided as part of a scanning system for lidar. Advantageously, the control circuitry of the polygonal-mirror system is configured to modify the output signal of the rotary encoder to increase the resolution of the lidar system or to compensate for manufacturing defects in the polygonal mirror.

SUMMARY OF THE INVENTION

Accordingly, the present invention relates to a scanning system for lidar comprising: a nodding mirror having a nodding axis and a centered position; a rotary electromagnetic drive configured to rotate the nodding mirror clockwise and counterclockwise about the nodding axis, comprising: a yoke including a permanent magnet, and an arm including a coil at one end of the arm, wherein the coil is enclosed within the yoke, and an opposite end of the arm is coupled to the nodding mirror, such that movement of the coil within the yoke in response to a current causes the nodding mirror to rotate; a rotary optical encoder configured to produce an output signal in response to rotation of the nodding mirror; and control circuitry configured to adjust the current provided to the rotary electromagnetic drive in response to the output signal of the rotary optical encoder, such that the nodding mirror rotates in a reference scan pattern.

BRIEF DESCRIPTION OF THE DRAWINGS

The invention will be described in greater detail with reference to the accompanying drawings which represent preferred, exemplary embodiments thereof, wherein.

DETAILED DESCRIPTION

Scanning System for Lidar Including an Optimized Nodding-Mirror System

Figure 1A:
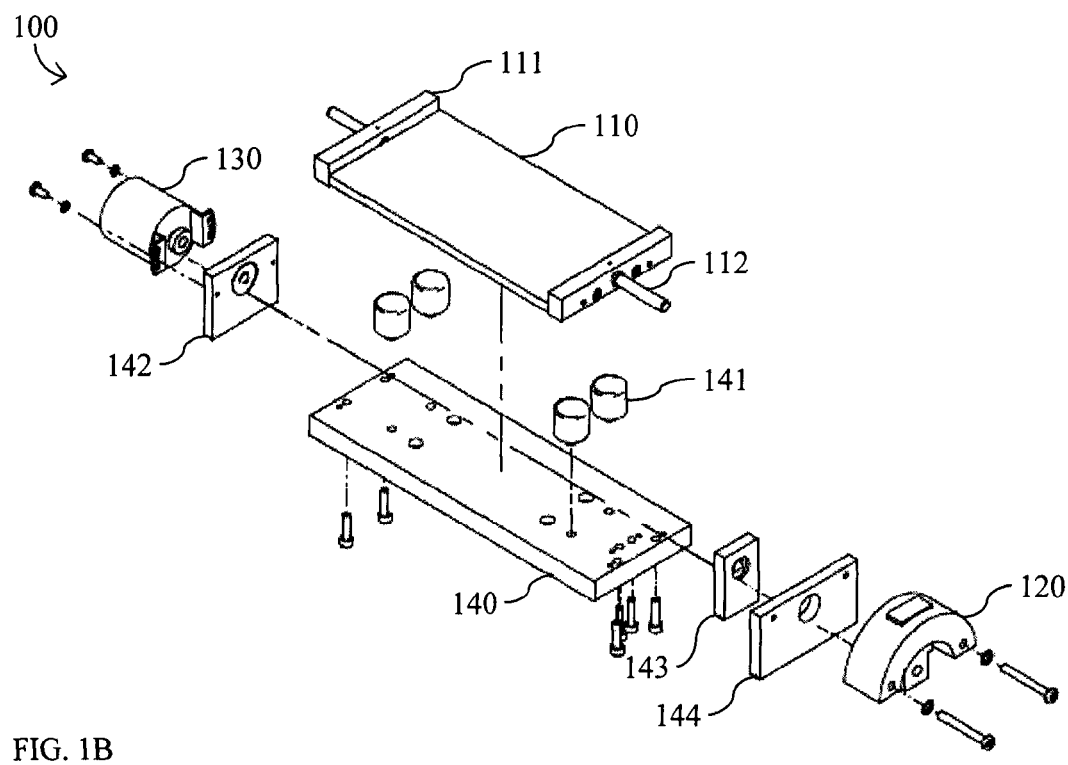
FIG. 1A is an illustration of an exploded perspective view of a nodding-mirror system.
Figure 1B:
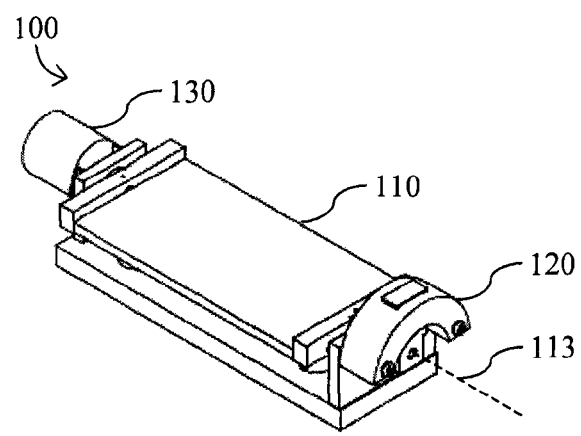
FIG. 1B is an illustration of a perspective view of a nodding-mirror system.

With reference to FIGS. 1A and 1B, the present invention provides a scanning system for lidar including an optimized nodding-mirror system 100. The nodding-mirror system 100 includes a nodding mirror 110, a rotary electromagnetic drive 120, a rotary optical encoder 130, and control circuitry (not shown). The nodding mirror 110 has a nodding axis 113 and a centered position. In the illustrated embodiment, the nodding mirror 110, which is approximately 200 mm long and 60 mm wide, is mounted on a mirror support 111 that includes a shaft 112, which coincides with the nodding axis 113 about which the nodding mirror 110 rotates. Preferably, the nodding mirror 110 is planar.

The nodding mirror 110 is coupled to both the rotary electromagnetic drive 120 and the rotary optical encoder 130 via the shaft 112. Preferably, the rotary electromagnetic drive 120 is coupled to the shaft 112 at one end of the nodding mirror 110, and the rotary optical encoder 130 is coupled to the shaft 112 at the opposite end of the nodding mirror 110, as in the illustrated embodiment. Such an arrangement minimizes twisting of the shaft 112 between the nodding mirror 110 and the rotary optical encoder 130, improving the accuracy of the rotary optical encoder 130. Preferably, the couplings are rigid.

In the illustrated embodiment, the assembly of the nodding mirror 110, the rotary electromagnetic drive 120, and the rotary optical encoder 130 is supported by a base 140 including bumpers 141, and side supports 142, 143, and 144.

In other embodiments, the nodding mirror 110, the rotary electromagnetic drive 120, and the rotary optical encoder 130 may be assembled in an alternative arrangement. For example, the rotary electromagnetic drive 120 and the rotary optical encoder 130 may both be coupled to the shaft 112 at the same end of the nodding mirror 110. Such an arrangement would minimize the resonant frequency of the closed-loop control system described hereafter. Furthermore, the assembly of the nodding mirror 110, the rotary electromagnetic drive 120, and the rotary optical encoder 130 may be supported by other suitable support means.

Figure 2A:
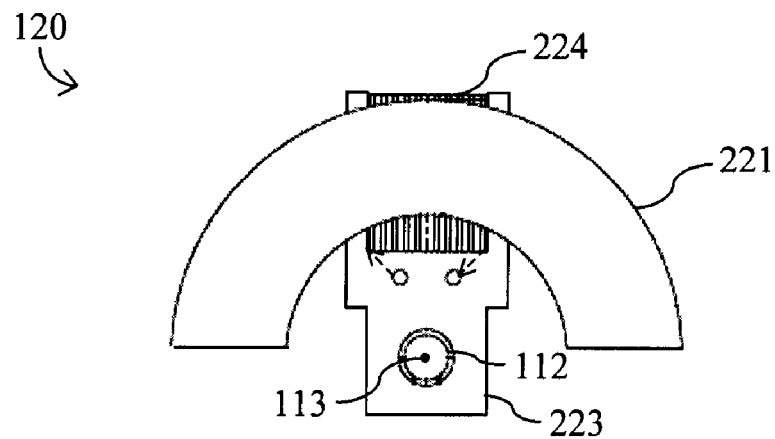
FIG. 2A is an illustration of a side view of a rotary electromagnetic drive for a nodding-mirror system.
Figure 2B:
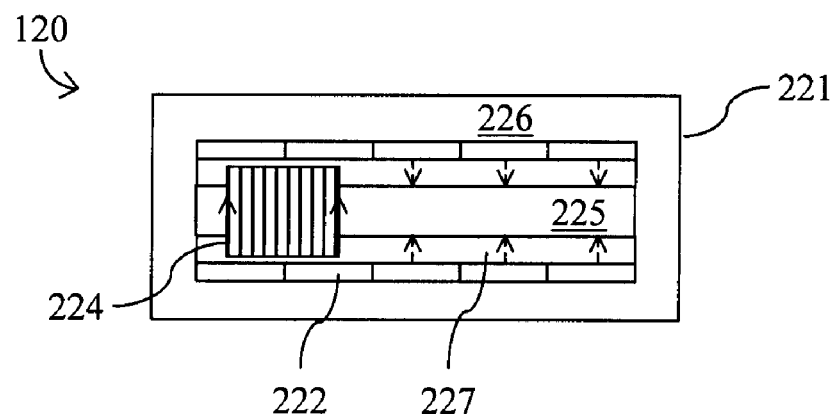
FIG. 2B is an illustration of a top view of a rotary electromagnetic drive for a nodding-mirror system.

With reference to FIGS. 2A and 2B, the rotary electromagnetic drive 120 comprises a yoke 221 including a permanent magnet 222, and an arm 223 including a coil 224 at one end. The yoke 221 is curved in a circular arc. Preferably, the yoke 221 includes a core 225, a shell 226, and a plurality of permanent magnets 222 mounted on the shell 226, as in the illustrated embodiment. The permanent magnets 222 are arranged such that their like magnetic poles face the core 225 and are separated from the core 225 by an air gap 227. Preferably, to maximize the magnetic field, indicated by arrows in FIG. 2B, the air gap 227 is as small as possible, and the core 225 is composed of a ferromagnetic material.

The coil 224 at one end of the arm 223 is enclosed within the yoke 221. The coil 224 encircles the core 225 and occupies the air gap 227. The end of the arm 223 opposite to the coil 224 is coupled to the shaft 112 at one end of the nodding mirror 110. The nodding mirror 110 is coupled to the arm 223, via the shaft 112, at a distance of a radius of the circular arc of the yoke 221 from the coil 224. Preferably, the coupling is rigid.

When a current, indicated by arrows in FIGS. 2A and 2B, is passed through the coil 224, a force is produced in a direction normal to the direction of the current and to the direction of the magnetic field, indicated by arrows in FIG. 2B. This force causes the coil 224 to move within the yoke 221 in response to the applied current. In turn, the movement of the coil 224 at one end of the arm 223 produces a torque on the shaft 112 at the opposite end of the arm 223, causing the nodding mirror 110 to rotate about the nodding axis 113. Preferably, the angular range through which the nodding mirror 110 rotates is at least ±10°. The direction of rotation of the nodding mirror 110 can be reversed by reversing the direction of the current provided to the coil 224. The angular speed of the nodding mirror 110 can be adjusted by varying the magnitude of the current provided to the coil 224. Typically, scan frequencies of 10-20 Hz are desired.

An example of a suitable rotary electromagnetic drive 120 is the rotary voice-coil actuator RA-29-11 produced by BEI Kimco Magnetics.

The rotary optical encoder 130 is configured to produce an output signal in response to rotation of the nodding mirror 110. The rotary optical encoder 130 includes a light source, an encoder disk, and a detector. The encoder disk is coupled to the shaft 112 at one end of the nodding mirror 110. As the nodding mirror 110 rotates, the encoder disk, which is marked with sets of lines, rotates between the light source and the detector. Accordingly, the detector produces a modulated output signal with a frequency proportional to the angular speed of the nodding mirror 110. Preferably, the rotary optical encoder 130 is configured to provide a sinusoidal output signal. Preferably, the output signal consists of two sine waves that are 90☐ out of phase.

An example of a suitable rotary optical encoder 130 is the ERN 1080-3600 incremental rotary encoder produced by Heidenhain, which has two sets of 3600 lines in quadrature on the encoder disk.

Figure 3:
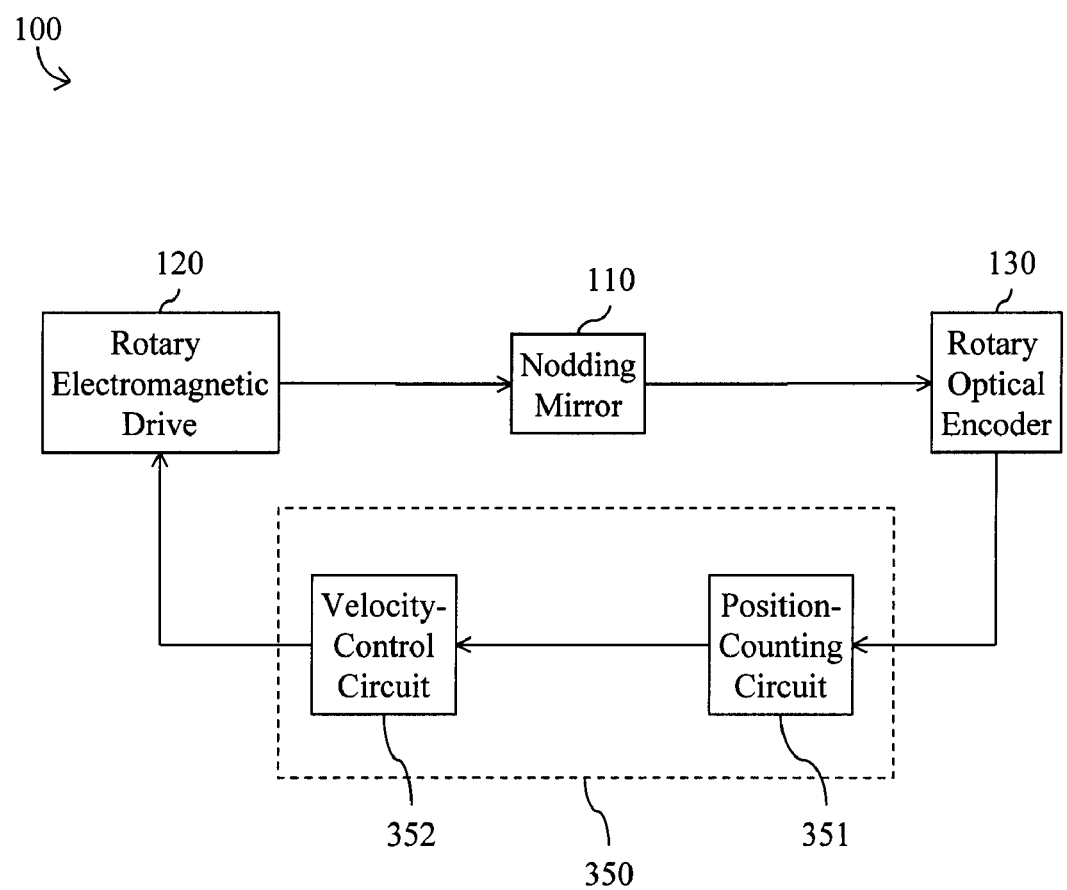
FIG. 3 is a diagram of a closed-loop control system for a nodding-mirror system.

With reference to FIG. 3, the output signal from the rotary optical encoder 130 serves as feedback to control circuitry 350. The control circuitry 350 adjusts the current provided to the rotary electromagnetic drive 120 in response to the output signal of the rotary optical encoder 130 to ensure that the nodding mirror 110 rotates in a reference scan pattern, in a closed-loop control system.

Preferably, the control circuitry 350 is programmed with the reference scan pattern, which includes a reference angular range and a reference angular velocity. As a rangefinder typically, makes range measurements at a fixed rate, the reference angular velocity determines the resolution of the image produced by the lidar system. The reference angular range determines the field of view of the lidar system. Preferably, the control circuitry 350 is programmed with a plurality of scan patterns, and the scanning system includes a human-machine interface for selecting the reference scan pattern.

In the illustrated embodiment, the control circuitry 350 includes a position-counting circuit 351 and a velocity-control circuit 352. Preferably, the control circuitry 350 also includes an interpolation circuit.

The optional interpolation circuit is configured to interpolate the output signal of the rotary optical encoder 130, allowing the resolution of the rotary optical encoder 130 to be dramatically increased. The interpolation circuit divides a sinusoidal output signal into a desired number of increments that represent the angular positions of the rotary optical encoder 130. For example, if the sinusoidal output signal from a rotary optical encoder 130 including an encoder disk with two sets of 3600 lines in quadrature is interpolated to increase the resolution by a factor of 4096, the angular position of the nodding mirror 110 can be determined with an accuracy of 360☐/(3600×4×4096), or 6 microdegrees.

The position-counting circuit 351 is configured to count the increments of the output signal from the rotary optical encoder 130, preferably, after interpolation, to determine the angular position of the nodding mirror 110. In accordance with the reference scan pattern, when a limit of the reference angular range is reached, the sign of the reference angular velocity is changed to reverse the direction of rotation of the nodding mirror 110.

The velocity-control circuit 352 is configured to control the angular velocity of the nodding mirror 110. The velocity-control circuit 352 determines the angular velocity of the nodding mirror 110 and compares the angular velocity to the reference angular velocity. On the basis of the error between the angular velocity and the reference angular velocity, the velocity-control circuit 352 adjusts the current provided to the coil 224 of the rotary electromagnetic drive 120. Preferably, the velocity-control circuit 352 is a proportional-integral (PI) control circuit, which both calculates the error and integrates the error over time. The current provided to the coil 224 is then adjusted on the basis of a proportional error term, which ensures that the short-term angular velocity is correct, and an integral error term, which ensures that the average angular velocity is correct.

An example of suitable control circuitry 350 is the HAR-A2/100I motor controller produced by Elmo Motion Control.

Figure 4A:
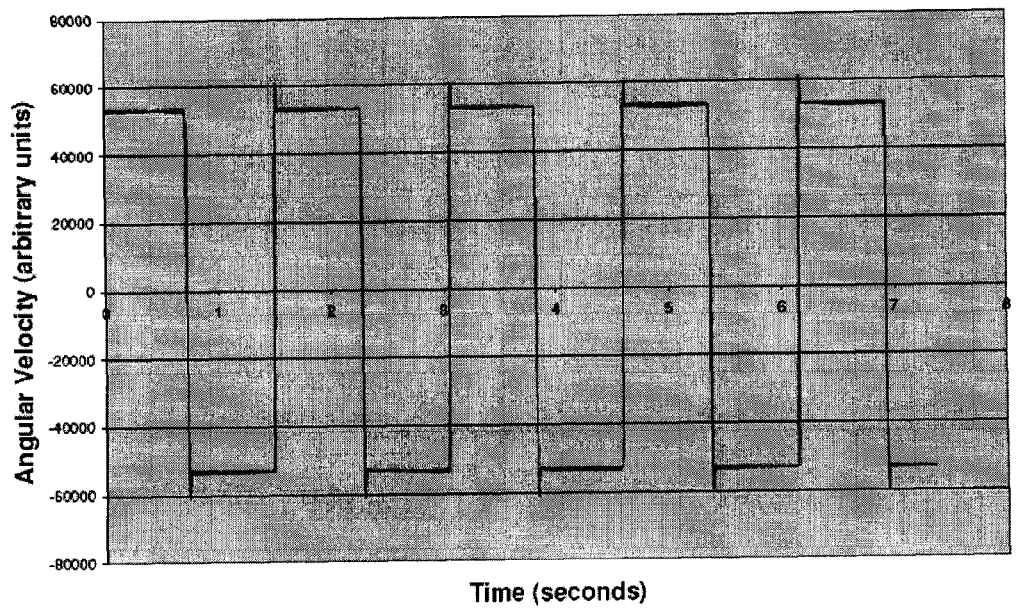
FIG. 4A is a plot of angular velocity versus time for a nodding mirror of a nodding-mirror system, rotating in a triangular scan pattern.
Figure 4B:
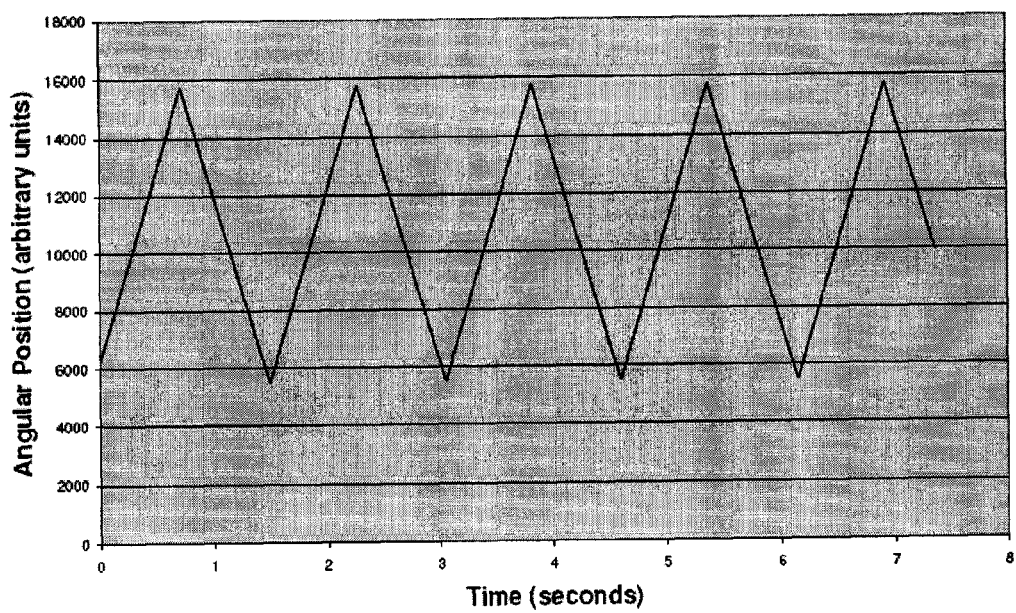
FIG. 4B is a plot of angular position versus time for a nodding mirror of a nodding-mirror system, rotating in a triangular scan pattern.

The nodding-mirror system 100 provided as part of the scanning system of the present invention allows useful information to be gathered into a rangefinder while the nodding mirror 110 is rotating both clockwise and counterclockwise through the reference angular range. Thus, in a preferred embodiment of the scanning system, the control circuitry 350 controls the nodding mirror 110 to rotate in a triangular scan pattern. In such a scan pattern, the reference angular velocity is constant over the reference angular range and reverses sign at the limits of the angular range. To demonstrate the performance of such an embodiment, plots of angular velocity versus time and of angular position versus time for the nodding mirror 110 rotating in a triangular scan pattern are presented in FIGS. 4A and 4B, respectively.

In other embodiments, the control circuitry 350 may be configured to control the nodding mirror 110 to perform other types of scan patterns in which the reference angular velocity varies in magnitude over the reference angular range and reverses sign at the limits of the angular range. Such a scan pattern can have virtually any waveform. For instance, the control circuitry 350 can be configured to control the nodding mirror 110 to rotate in a sinusoidal scan pattern. A sinusoidal scan pattern is advantageous for achieving high scan frequencies, because the angular acceleration required to reverse the angular velocity at the limits of the angular range is lower than in a triangular scan pattern.

Alternatively, the control circuitry 350 can be configured to control the nodding mirror 110 to rotate in a scan pattern optimized for a particular application of a lidar system. In such an optimized scan pattern, the magnitude of the reference angular velocity is higher over a segment of the angular range requiring lower resolution and lower over a different segment of the angular range requiring higher resolution. For example, in a scan pattern optimized for a lidar system mounted on a vehicle moving along a road, the nodding mirror 110 rotates quickly through the lower part of the field of view, which includes the road near the vehicle where objects are easier to identify, and rotates slowly through the upper part of the field of view, which includes the scene further away from the vehicle where objects are more difficult to identify.

The nodding-mirror system 100 provided as part of the scanning system of the present invention also allows the reference scan pattern to be readily and dynamically changed. Thus, the field of view and the resolution of a lidar system can be adjusted while the scanning system is in operation. In a preferred embodiment, the scanning system includes a computer, which is configured with a program for determining the most efficient way to scan the field of view of the lidar system. The computer selects an updated reference scan pattern and reprograms the control circuitry 350 with the updated reference scan pattern while the scanning system is in operation. For instance, the computer might direct the nodding-mirror system 110 to rapidly scan a large field of view to produce a low-resolution image and then, once objects of interest have been identified, to slowly scan smaller sections of the overall field of view to image these sections at much higher resolution. Alternatively, the scanning system may include a human-machine interface for reprogramming the control circuitry 350 with an updated reference scan pattern while the scanning system is in operation. A user then performs the selection of the updated reference scan pattern while reviewing images from the lidar system in real time. This scanning method, which we call foveal scanning, mimics the behavior of the human eye in focusing the part of interest of an image on the fovea, an area of the retina with a high-resolution imaging capability.

In another preferred embodiment of the scanning system, the control circuitry 350 of the nodding-mirror system 100 is interfaced to a pitch-angle detector, which produces an output signal in response to a pitch angle of the scanning system. Suitable pitch-angle detectors include global positioning system (GPS)/inertial systems and sensors based on microelectromechanical systems (MEMS). In response to the output signal of the pitch-angle detector, the control circuitry 350 adjusts the reference scan pattern of the nodding mirror 110 by shifting the reference angular range to compensate for the pitch angle of the scanning system. Such an embodiment is particularly advantageous for a lidar system mounted on a moving vehicle, for example, a car on a road, a ship at sea, or an aircraft in flight. The present invention adjusts the field of view of such a lidar system to compensate for pitching motion, facilitating the identification of objects.

Figure 5:
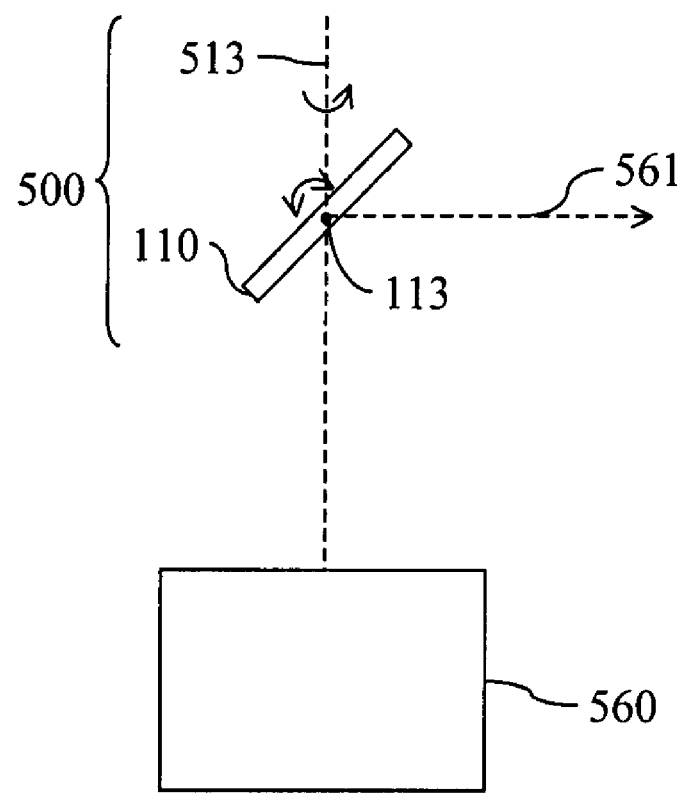
FIG. 5 is an illustration of a scanning system including a nodding/rotating-mirror system, combined with a rangefinder.

With reference to FIG. 5, another preferred embodiment of the scanning system includes a nodding/rotating-mirror system 500. In the nodding/rotating-mirror system 500, the nodding mirror 110 has a rotation axis 513, about which it can rotate clockwise or counterclockwise through 360°. The nodding/rotating-mirror system 500 also includes a rotary drive configured to rotate the nodding mirror 10 about the rotation axis 513, in addition to the rotary electromagnetic drive 120 configured to rotate the nodding mirror 110 clockwise and counterclockwise about the nodding axis 113.

Preferably, the rotation axis 513 is orthogonal to the nodding axis 113 and is at an angle of 45° to the centered position of the nodding mirror 110. Such an embodiment allows data to be collected into a rangefinder 560 over a full 360° rotation in a horizontal plane about the rotation axis 513. The optical path 561 of light emitted from the rangefinder 560 can be further controlled by rotation about the nodding axis 113, which scans the optical path of the light vertically.

Figure 6:
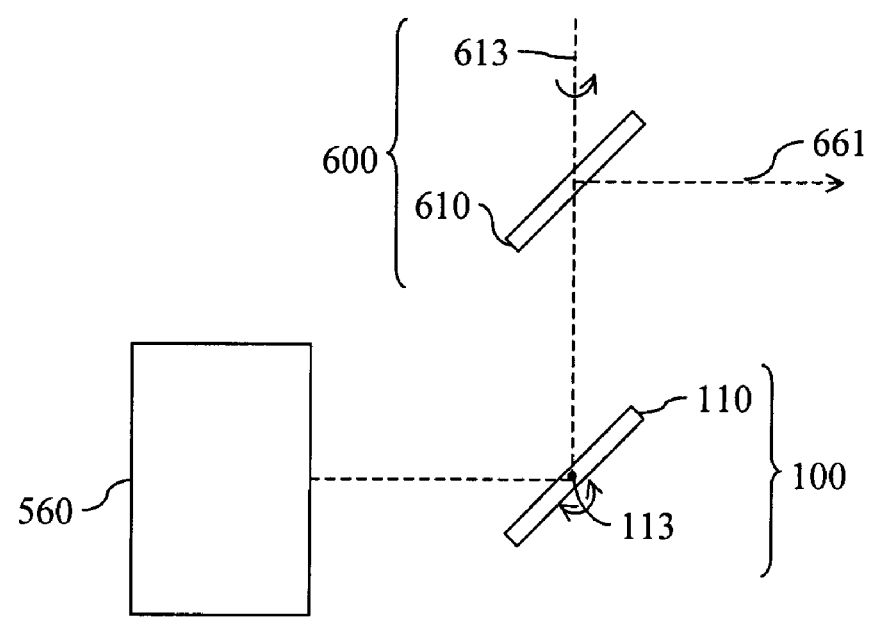
FIG. 6 is an illustration of a scanning system including a nodding-mirror system and a rotating-mirror system, combined with a rangefinder.

To achieve higher angular speeds of rotation, it is desirable for the mass of the rotating body to be as low as possible. Thus, in some instances, it may be advantageous to use a separate rotating-mirror system for 360° scanning. With reference to FIG. 6, the present invention provides a scanning system including a rotating-mirror system 600, in addition to the nodding-mirror system 100. The rotating-mirror system 600 includes a rotating mirror 610 having a rotation axis 613, and a rotary drive configured to rotate the rotating mirror 610 about the rotation axis 613.

The rotating mirror 610 can rotate clockwise or counterclockwise through 360° about the rotation axis 613, which is orthogonal to the nodding axis 113 of the nodding mirror 110. Preferably, the rotating mirror 610 is planar. Preferably, the rotation axis 613 of the rotating mirror 610 is at an angle of 45° to the rotating mirror 610 and to the centered position of the nodding mirror 110. When combined with a rangefinder 560, as shown in FIG. 6, the nodding mirror 110 deviates the optical path 661 of light emitted from the rangefinder 560, allowing the 360° horizontal field of view provided by the rotating mirror 610 to be adjusted in the vertical direction.

Figure 7:
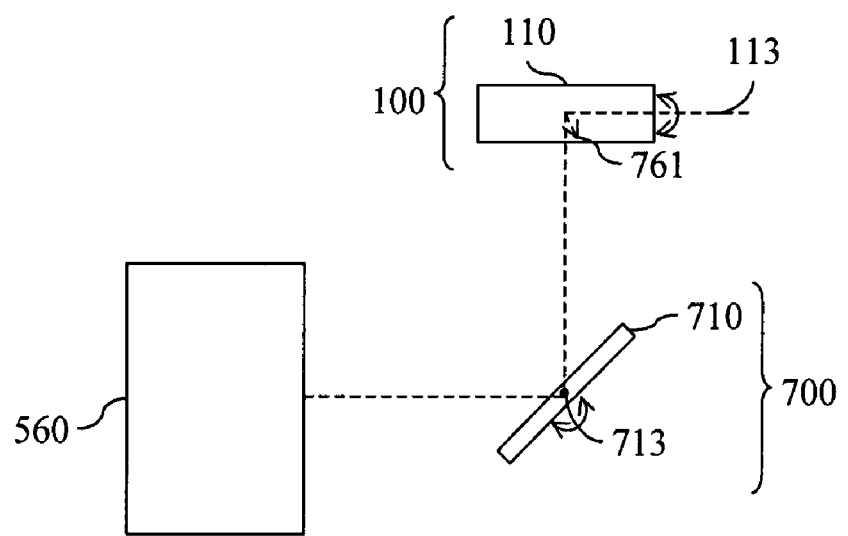
FIG. 7 is an illustration of a scanning system including a nodding-mirror system and a second nodding-mirror system, combined with a rangefinder.

In some instances, it may be advantageous to include an additional nodding-mirror system in the scanning system. With reference to FIG. 7, the present invention provides a scanning system including a second nodding-mirror system 700, in addition to the nodding-mirror system 100. The second nodding-mirror system 700 includes a second nodding mirror 710 having a second nodding axis 713 and a second centered position, and a second rotary drive configured to rotate the second nodding mirror 710 clockwise and counterclockwise about the second nodding axis 713.

The second nodding axis 713 of the second nodding mirror 710 is orthogonal to the nodding axis 113 of the nodding mirror 110. Preferably, the second nodding mirror 710 is planar. Preferably, the nodding axis 113 of the nodding mirror 110 is at an angle of 45° to the centered position of the second nodding mirror 710, and the second nodding axis 713 of the second nodding mirror 710 is at an angle of 45° to the centered position of the nodding mirror 110. Thus, when combined with a rangefinder 560, as shown in FIG. 7, the nodding-mirror system 100 and the second nodding-mirror system 700 scan the field of view of a lidar system over two orthogonal directions. For reference, when the nodding mirror 110 is in the centered position and the second nodding mirror 710 is in the second centered position, the optical path 761 of light emitted from the rangefinder 560 is directed out of the page in FIG. 7. Such an embodiment is advantageous, because it allows the entire field of view of a lidar system to be scanned with near-perfect collection efficiency.

Preferably, the second nodding-mirror system 700 has the same advantageous combination of elements as the nodding-mirror system 100, and includes a second nodding mirror 710, a second rotary electromagnetic drive, a second rotary optical encoder, and second control circuitry that are essentially equivalent to the nodding mirror 110, the rotary electromagnetic drive 120, the rotary optical encoder 130, and the control circuitry 350, respectively, described heretofore. When two such optimized nodding-mirror systems 100 and 500 are used in conjunction in a scanning system, the nodding mirror 110 and the second nodding mirror 710 can both be rotated at similar average angular speeds in a variety of reference scan patterns. Preferably, the second average angular speed of the second nodding mirror 710 is within ±20% of the average angular speed of the nodding mirror 110. In contrast, in conventional dual-mirror scanning systems, one mirror is typically rotated at a much higher average angular speed than the other, such that one direction is scanned very quickly and the other directions are scanned relatively slowly.

For instance, the reference scan pattern of the nodding-mirror system 100 and the second reference scan pattern of the second nodding-mirror system 700 may both be triangular scan patterns. Alternatively, the reference scan pattern and the second reference scan pattern may both be sinusoidal scan patterns, and the resulting combined scan pattern will be one of the well-known Lissajous figures. Preferably, the reference scan pattern and the second reference scan pattern include similar or equivalent reference angular velocities. In some instances, the reference scan pattern and the second reference scan pattern also include similar or equivalent reference angular ranges.

Preferably, the control circuitry 350 of the nodding-mirror system 100 and the second control circuitry of the second nodding-mirror system 700 are programmed with the reference scan pattern and the second reference scan pattern, respectively. In some instances, the control circuitry 350 and the second control circuitry can be reprogrammed with an updated reference scan pattern and an updated second reference scan pattern, respectively, by a computer or a user while the scanning system is in operation, according to the foveal scanning method described heretofore.

Figure 8:
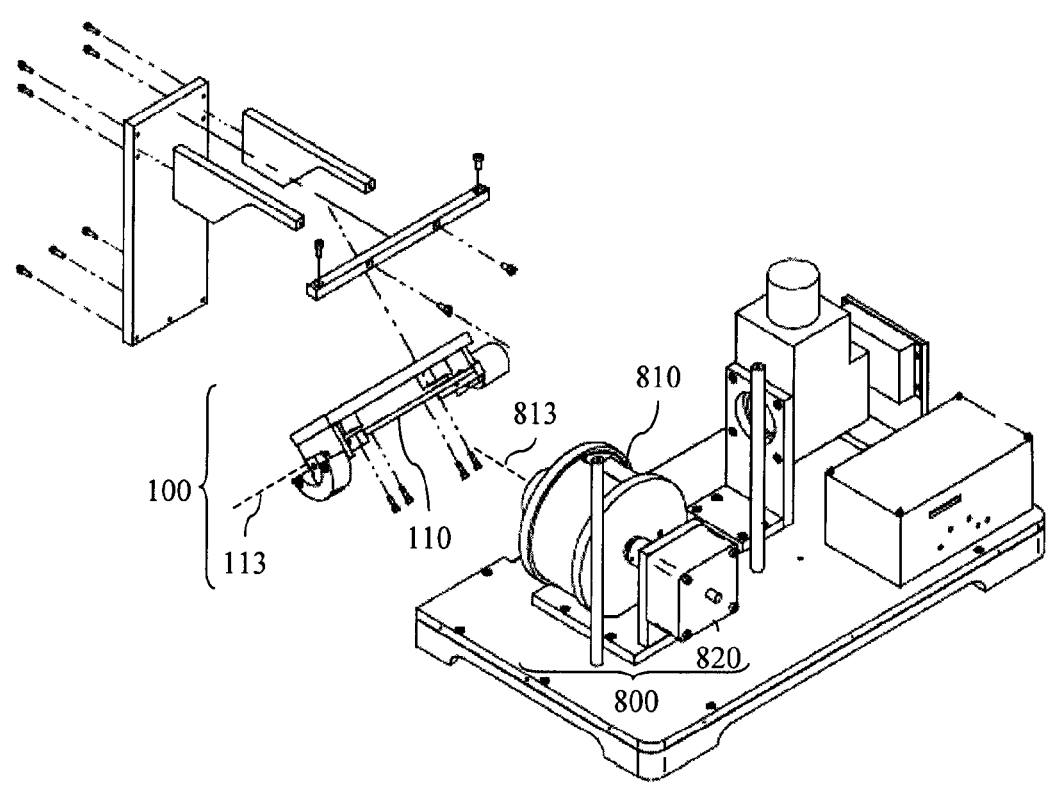
FIG. 8 is an illustration of a partially exploded perspective view of a scanning system including a nodding-mirror system and a polygonal-mirror system.

With reference to FIG. 8, another preferred embodiment of the scanning system includes a polygonal-mirror system 800, in addition to the nodding-mirror system 100. The polygonal-mirror system 800 includes a polygonal mirror 810 having a rotation axis 813, and a rotary drive 820 configured to rotate the polygonal mirror 810 about the rotation axis 813. The polygonal mirror 810 can rotate clockwise or counterclockwise through 360° about the rotation axis 813, which is orthogonal to the nodding axis 113 of the nodding mirror 110. When combined with a rangefinder 560, the nodding mirror 110 deviates the optical path of light emitted from the rangefinder 560, allowing the 360° horizontal field of view provided by the polygonal mirror 810 to be adjusted in the vertical direction.

Scanning System for Lidar Including an Optimized Polygonal-Mirror System

Figure 9:
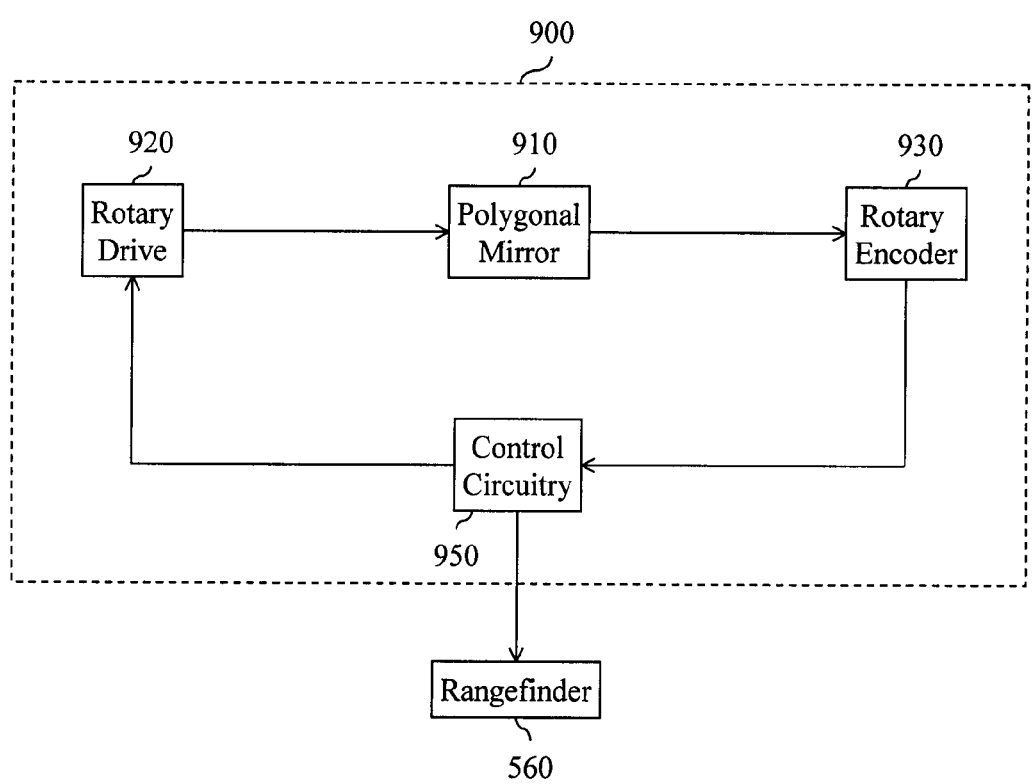
FIG. 9 is a diagram of a closed-loop control system for a polygonal-mirror system, combined with a rangefinder.

The present invention also provides a scanning system for lidar including an optimized polygonal-mirror system. With reference to FIG. 9, the polygonal-mirror system 900 includes a polygonal mirror 910, a rotary drive 920, a rotary encoder 930, and control circuitry 950.

The polygonal mirror 910 is shaped as a regular polygon having a plurality of facets of an ideal length that are oriented at an ideal angle to one another. Preferably, the polygonal mirror 910 is a hexagonal mirror with six facets of equal length at 60° to one another. The polygonal mirror 910 can rotate clockwise or counterclockwise through 360° about a rotation axis that coincides with the polygonal axis.

Figure 10:
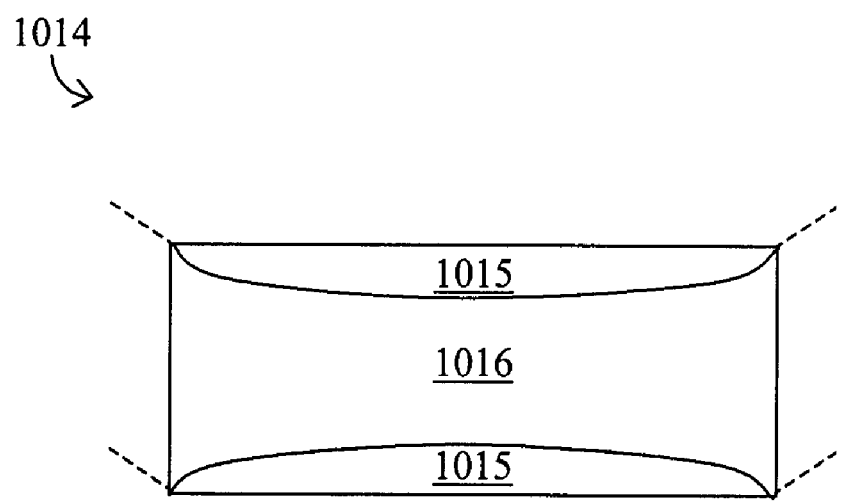
FIG. 10 is an illustration of a facet of a masked polygonal mirror for a polygonal-mirror system.

As mentioned heretofore, the collection efficiency of a conventional polygonal mirror varies with angular position and decreases to 50% as light emitted from a rangefinder 560 approaches the edges of the facets. Therefore, in a preferred embodiment of the scanning system provided by the present invention, the polygonal mirror 910 is masked to improve the uniformity of the collection efficiency. With reference to FIG. 10, the masked polygonal mirror 910 includes facets 1014 having masked regions 1015 of low reflectivity and an unmasked region 1016 of high reflectivity.

To determine the optimal dimensions and characteristics of the masked regions 1015, the collection efficiency as a function of angular position of the polygonal mirror 910 is calculated prior to masking. Such a calculation may be performed from first principles or by using suitable software, by taking into account factors such as the size of the facets 1014, the offset of the polygonal mirror 910 from the optical path of light from the rangefinder 560, and the size of the aperture of the rangefinder 560. On the basis of the results of such a calculation, regions of the polygonal mirror 910 having a high collection efficiency are masked with a layer of a material that absorbs light at the wavelength of the laser of the rangefinder 560. Furthermore, the thickness of the layer within these masked regions 1015 is varied to compensate for the variation in the calculated collection efficiency. The layer is applied in the masked regions 1015 of the polygonal mirror 910 by painting the material onto the surface or by depositing the material through a mask.

The rotary drive 920 is configured to rotate the polygonal mirror 910 about the rotation axis, and the rotary encoder 930 is configured to produce a pulsed output signal in response to rotation of the polygonal mirror 910. The control circuitry 950 adjusts a current provided to the rotary drive 920 in response to the pulsed output signal of the rotary encoder 930 to ensure that the polygonal mirror 910 rotates in a reference scan pattern, in a closed-loop control system.

Preferably, the control circuitry 950 is programmed with the reference scan pattern. In some instances, the control circuitry 950 can be reprogrammed with an updated reference scan pattern by a computer or a user, while the scanning system is in operation, according to the foveal scanning method described heretofore.

The pulsed output signal of the rotary encoder 930 is also used to trigger data acquisition by the rangefinder 560. Advantageously, the control circuitry 950 is interfaced with the rangefinder 560 and is configured to provide the rangefinder 560 with a modified pulsed output signal. Preferably, the control circuitry 950 is configured to increase the frequency of the pulsed output signal, thereby, increasing the frequency of data collection by the rangefinder 560. Thus, the resolution of a lidar system may be increased to an upper limit determined by the response time of the rangefinder 560, rather than by the resolution of the rotary encoder 930.

In another preferred embodiment, the control circuitry 950 is configured to modify the pulsed output signal to compensate for manufacturing defects in the polygonal mirror 910. For example, to offset deviations in the angles between the facets 1014 of the polygonal mirror 910 from the ideal angle, adjustable delays can be inserted before the pulse train for each facet 1014. The time at which the data acquisition by the rangefinder 560 is triggered is changed slightly to allow the polygonal mirror 910 to rotate through a slightly greater or smaller angle. Such a configuration reduces the effects of one of the most common types of manufacturing error for polygonal mirrors 910 and leads to improvement in the clarity of imaging by a lidar system.

Of course numerous other embodiments may be envisaged without departing from the spirit and scope of the invention.

We claim:

1. A scanning system for lidar comprising:
a nodding mirror having a nodding axis and a centered position;
a rotary electromagnetic drive configured to rotate the nodding mirror clockwise and counterclockwise about the nodding axis, comprising:
a yoke including a permanent magnet, and
an arm including a coil at one end of the arm,
wherein the coil is enclosed within the yoke, and an opposite end of the arm is coupled to the nodding mirror, such that movement of the coil within the yoke in response to a current causes the nodding mirror to rotate;
a rotary optical encoder configured to produce an output signal in response to rotation of the nodding mirror; and
control circuitry configured to adjust the current provided to the rotary electromagnetic drive in response to the output signal of the rotary optical encoder, such that the nodding mirror rotates in a reference scan pattern.

2. The scanning system of claim 1 wherein the arm of the rotary electromagnetic drive is coupled to one end of the nodding mirror, and the rotary optical encoder is coupled to an opposite end of the nodding mirror.

3. The scanning system of claim 1 wherein the yoke is shaped as a circular arc, and the nodding mirror is coupled to the arm at a distance of a radius of the circular arc from the coil.

4. The scanning system of claim 1 wherein the yoke includes a core and a shell, wherein a plurality of permanent magnets are mounted on the shell, such that like magnetic poles of the permanent magnets face the core.

5. The scanning system of claim 1 wherein the rotary optical encoder produces a sinusoidal output signal.

6. The scanning system of claim 1 wherein the control circuitry is programmed with the reference scan pattern.

7. The scanning system of claim 1 wherein the control circuitry is programmed with a plurality of scan patterns, further comprising a human-machine interface for selecting the reference scan pattern.

8. The scanning system of claim 1 wherein the control circuitry comprises a position-counting circuit configured to determine an angular position of the nodding mirror, and a velocity-control circuit configured to control an angular velocity of the nodding mirror.

9. The scanning system of claim 5 wherein the control circuitry comprises an interpolation circuit configured to interpolate the output signal of the rotary optical encoder.

10. The scanning system of claim 1 wherein the reference scan pattern is a triangular scan pattern.

11. The scanning system of claim 1 wherein the reference scan pattern includes a reference angular range and a reference angular velocity, wherein the reference angular velocity varies in magnitude over the reference angular range.

12. The scanning system of claim 1 wherein the reference scan pattern is a sinusoidal scan pattern.

13. The scanning system of claim 6 further comprising a computer configured to select an updated reference scan pattern and to reprogram the control circuitry with the updated reference scan pattern while the scanning system is in operation.

14. The scanning system of claim 6 further comprising a human-machine interface for reprogramming the control circuitry with an updated reference scan pattern while the scanning system is in operation.

15. The scanning system of claim 1 further comprising a pitch-angle detector configured to produce an output signal in response to a pitch angle of the scanning system, wherein the control circuitry is further configured to adjust the reference scan pattern in response to the output signal of the pitch-angle detector.

16. The scanning system of claim 1 wherein the nodding mirror has a rotation axis, further comprising a rotary drive configured to rotate the nodding mirror about the rotation axis.

17. The scanning system of claim 16 wherein the rotation axis is orthogonal to the nodding axis and is at an angle of 45 degrees to the centered position.

18. The scanning system of claim 1 further comprising a rotating mirror having a rotation axis, wherein the rotation axis of the rotating mirror is orthogonal to the nodding axis of the nodding mirror, and a rotary drive configured to rotate the rotating mirror about the rotation axis.

19. The scanning system of claim 18 wherein the rotation axis of the rotating mirror is at an angle of 45 degrees to the rotating mirror and to the centered position of the nodding mirror.

20. The scanning system of claim 1 further comprising a second nodding mirror having a second nodding axis and a second centered position, wherein the second nodding axis of the second nodding mirror is orthogonal to the nodding axis of the nodding mirror, and a second rotary drive configured to rotate the second nodding mirror clockwise and counter-clockwise about the second nodding axis.

21. The scanning system of claim 20 wherein the nodding axis of the nodding mirror is at an angle of 45 degrees to the second centered position of the second nodding mirror, and the second nodding axis of the second nodding mirror is at an angle of 45 degrees to the centered position of the nodding mirror.

22. The scanning system of claim 20 wherein the second rotary drive is a second rotary electromagnetic drive comprising:
a second yoke including a second permanent magnet, and
a second arm including a second coil at one end of the second arm,
wherein the second coil is enclosed within the second yoke, and an opposite end of the second arm is coupled to the second nodding mirror, such that movement of the second coil within the second yoke in response to a second current causes the second nodding mirror to rotate,
further comprising:
a second rotary optical encoder configured to produce a second output signal in response to rotation of the second nodding mirror, and
second control circuitry configured to adjust the second current provided to the second rotary electromagnetic drive in response to the second output signal of the second rotary optical encoder, such that the second nodding mirror rotates in a second reference scan pattern.

23. The scanning system of claim 22 wherein the reference scan pattern and the second reference scan pattern are triangular scan patterns.

24. The scanning system of claim 22 wherein the reference scan pattern and the second reference scan pattern are sinusoidal scan patterns.

25. The scanning system of claim 1 further comprising a polygonal mirror having a rotation axis, wherein the rotation axis of the polygonal mirror is orthogonal to the nodding axis of the nodding mirror, and a rotary drive configured to rotate the polygonal mirror about the rotation axis.

* * * * *